United States Patent [19]

Danszky et al.

[11] 4,102,407
[45] Jul. 25, 1978

[54] REFORESTATION TILLAGE MECHANISM

[75] Inventors: István Danszky, Budapest; Dezsö Szecska, Kecskemet, both of Hungary

[73] Assignee: Erdészeti Tudományos Intézet, Budapest, Hungary

[21] Appl. No.: 663,987

[22] Filed: Mar. 4, 1976

Related U.S. Application Data

[63] Continuation-in-part of Ser. No. 409,258, Oct. 24, 1973, abandoned.

[51] Int. Cl.² ............................................. A01B 13/08
[52] U.S. Cl. .................................. 172/611; 172/700; 172/768; 172/719
[58] Field of Search .............. 172/699, 700, 723, 722, 172/766, 719, 768, 765; 111/7; 37/2 R, 193

[56] References Cited

U.S. PATENT DOCUMENTS

| 1,144,176 | 6/1915 | Desy | 172/768 |
| 2,569,556 | 10/1951 | Collins | 172/699 |
| 2,633,792 | 4/1953 | Haines | 172/765 |
| 3,002,574 | 10/1961 | Padrick | 172/699 |
| 3,188,988 | 6/1965 | Peck | 111/7 |

FOREIGN PATENT DOCUMENTS

| 904,577 | 3/1945 | France | 172/700 |
| 952,573 | 12/1956 | Fed. Rep. of Germany | 172/700 |
| 641,744 | 8/1950 | United Kingdom | 172/699 |

*Primary Examiner*—Richard J. Johnson

[57] ABSTRACT

Reforestation tillage mechanism comprising at least one pivotable suspension frame; at least one blade holder shank having a free upper end and being freely pivotable with an intermediate portion thereof in a plane, the main axis of the shank being substantially normal to the axis about which the frame can pivot; at least one, substantially straight cutter blade removably and adjustably mounted to a lower portion of the shank, to be partly lowered into the soil, defining an angle of about 120° to 155°, downwardly inclined with respect to the direction of haulage of the tiller but opposite thereto; at least one pair of substantially parallel tiller blades exchangeably mounted on the shank, behind the cutter blade with respect to the direction of haulage, sloping with respect thereto, and defining an angle of about 10° to 40°, upwardly inclined toward the rear free ends of the tiller blades with respect to the direction of haulage; the frame, shank, cutter blades and tiller blades constituting one or more tiller mechanisms; and a mechanism for attaching the latter to stationary portions of the tiller by the intermediary of a three-point hitch with freedom of selective pivotal and angular movement with respect to the stationary tiller portions and the soil; whereby the blades normally till the soil but some large stump in the soil can divert the tiller mechanism(s) upwardly about the attaching mechanism, so that the blades are at least partly lifted out of the soil, and then released to drop by their weight, to continue the tilling without any breakage or trouble.

10 Claims, 9 Drawing Figures

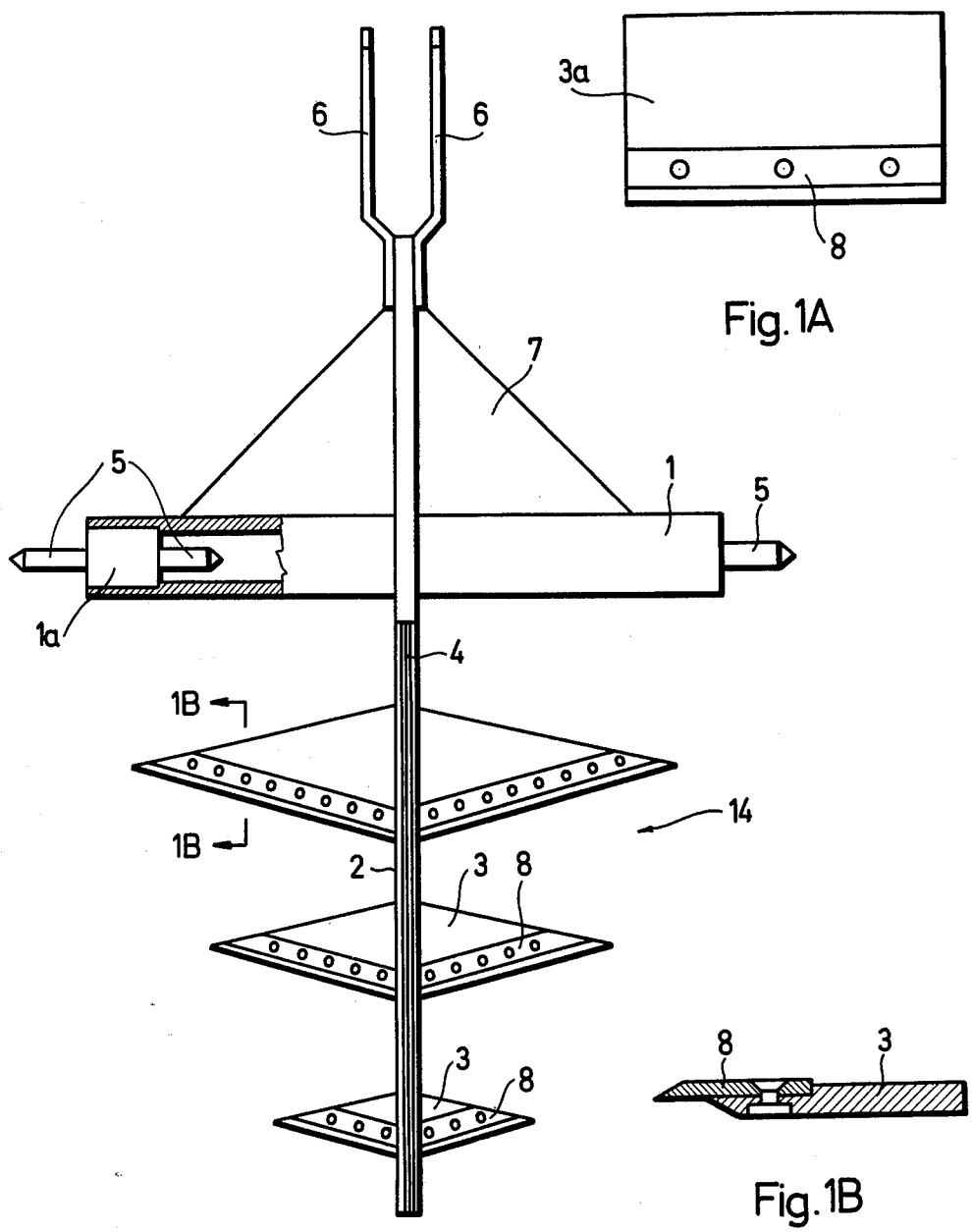
Fig.1A
Fig.1B
Fig.1
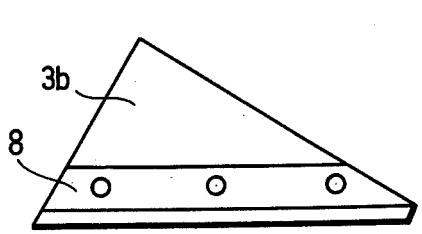
Fig.2
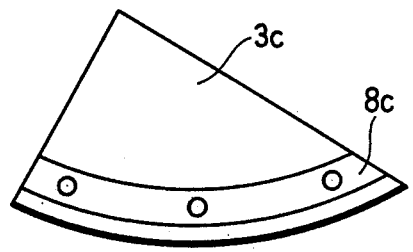
Fig.3

REFORESTATION TILLAGE MECHANISM

This is a continuation-in-part application of the aplicants' earlier patent application, Ser. No. 409,258, filed Oct. 24, 1973, titled "Reforestation Tiller," now abandoned.

The invention relates to a tiller, e.g. for reforestation purposes, having a straight cutter which defines an angle of 120 to 155° with the direction of haulage but opposite thereto, and a number of blades starting behind the cutter, mounted to a holder shank, defining an angle of 10° to 40° with respect to the substantially horizontal direction of advancement of haulage of the tiller. Any large stump or thick root can tilt the mechanism about suspension pins by the aid of which a suspension frame is pivotally supported, for carrying the cutter and the blades, which then lift the mechanism out of the soil, and the same can continue to operate without any trouble. One or more mechanisms can be included in the tiller.

The tiller is suitable for soil preparation even in areas full of stumps and roots, which makes the expensive and cumbersome stump and root removal operations entirely superfluous. The use of the tiller is not restricted to soil preparation for the reforestation of areas full of stumps, as it can be advantageously employed for other forestry operations as well (e.g. sprouting in coppice), for orchard and vineyard plantation purposes, and in many other fields of agriculture.

Forestation and reforstation operations represent an important part of soil preparation activities. As a result of good soil preparation, both the physiological depth and the water intake capacity of the soil increase, which is of a fundamental importance for young plants.

In present reforestation procedures soil preparation must be preceded by the removal of stumps and thick root parts, and deep ploughing may follow only afterwards.

According to the prior art, only tillage of sufficient depth can lead to acceptable results.

The high machine, labor and cost requirements of the above operations compelled the inventors to aim at the development of tiller equipment which, in addition to meeting all the requirements of reforestation, can operate with a higher efficiency at a lower input.

Owing to their nature, tillers used after stump and root removal are identical to those employed in agriculture, like various plough and subsoiler types.

For deep tillage very often the PP-5- Pg and the PPU-50A type rigol ploughs, the DMR type NARDI plough, or the B-175 type, made in the German Democratic Republic, are employed.

The subsoilers are very much different in character. Agriculture makes use of wing-type and serrated units. Such a winged type is described in Hungarian Standard No. 88,309-1, including vertical blades located in a sawtooth manner between protruding wings. The most widely known toothed or serrated subsoilers are the FA-3/2 type, and the bent-web type Massey Ferguson unit. In the subsoiler category, replacing ploughs, the RL-2.1 and RL-2.1B types have been most commonly accepted. Local soil preparation is performed with different pit drills.

Theoretical and practical investigations proved unequivocally that none of the known constructions, or those mentioned in the literature, are suitable to solve the tillage problems over areas full of stumps and thick roots.

The recognition and the subsequent present invention have led, by departing from hitherto known constructional principles, to the development of an equipment with a mechanism containing a straight cutting blade which defines an obtuse angle with respect to the horizontal traveling direction, and tiller baldes starting behind this cutter, inclined in the latter's direction, that are mounted to the shaft supporting the blade.

According to important features of the invention, a reforestation tillage mechanism is provided, comprising at least one pivotable suspension frame; at least one pair of suspension pins on spaced-apart portions of the frame; at least one blade holder shank having a free upper end and being freely pivotable with an intermediate portion thereof about the pins in a plane, the main axis of the shank being substantially normal to the axis about which the frame can pivot; at least one, substantially straight cutter removably and adjustably mounted to a lower portion of the shank, to be partly lowered into the soil, defining an angle of about 120° to 155°, downwardly inclined with respect to the direction of haluage of the tiller but opposite thereto; at least one pair of substantially parallel tiller blades exchangeably mounted on the shank, behind the cutter with respect to the direction of haulage, sloping with respect thereto, and defining an angle of about 10° to 40°, upwardly inclined toward the rear free ends of these blades with respect to the direction of haulage; the frame, shank, cutter and blades constituting at least one tiller mechanism; and a mechanism for attaching the latter to stationary portions of the tiller by the intermediary of a three-point suspension with freedom of selective pivotal and angular movement with respect to the stationary tiller portions and the soil; whereby the cutter and the blades normally till the soil but some large stump can divert the tiller mechanism(s) out of the soil, upwardly about the attaching mechanism so that the cutter and the blades are at least partly lifted out of the soil, and then released to drop by the weight of the tiller mechanism(s), to continue the tilling without any breakage or trouble.

As mentioned before, the cutter and the blades, and the associated structural parts, can be assembled to form one or more tiller mechanisms. The three-point suspension system is common to all embodiments of the invention, wherein the attaching means preferably includes respective linkages to the suspension pins and to the free end of the blade holder shank, one or both of the linkages being preferably adjustable in length or angular setting.

The tiller blades may be given special forms, to suit various terrain characteristics, such as trapezoidal, rectangular, triangular or semicircular. The cutter and/or the blades may have removable edge portions.

The blade holder shank is preferably strutted with one or a pair of rib plates with respect to the suspension frame. Each tiller mechanism may be provided with additional weights, and support means may also be provided therefor, removably secured to the suspension frame. If two tiller mechanisms are used, the weights are preferably attached between them, thus assisting in their dropping back into the soil after some stump has upwardly diverted the mechanism(s) out of the soil. The invention furthermore provides, as an optional feature, an intermediate support between the suspension frame(s) and the respective blade holder shank(s) thereon.

In a specific, preferred exemplary embodiment, the threepoint suspension may include a linkage with four members of which three are connected to the stationary tiller portions but only two to each tiller mechanism; two of the members from an articulation therebetween, linked to an adjustable intermediate point of one of the members that pivotally carries the mechanism(s). At least one of the linkage members has means for length adjustment thereof.

Preferred, exemplary embodiments of the inventive reforestation tillage mechanism are now being described in detail with reference to the accompanying drawings, wherein FIG. 1 is a plan view of the essential, operative parts of a reforestation tillage mechanism in accordance with the present invention;

FIG. 1A shows a rectangular tiller blade as an alternative to the trapezoidal form shown in FIG. 1;

FIG. 1B is a sectional view of a blade, taken along line 1B-1B of FIG. 1;

FIGS. 2, 3 are examples of alternative triangular and semicircular or arcuate blades;

Figure 6:
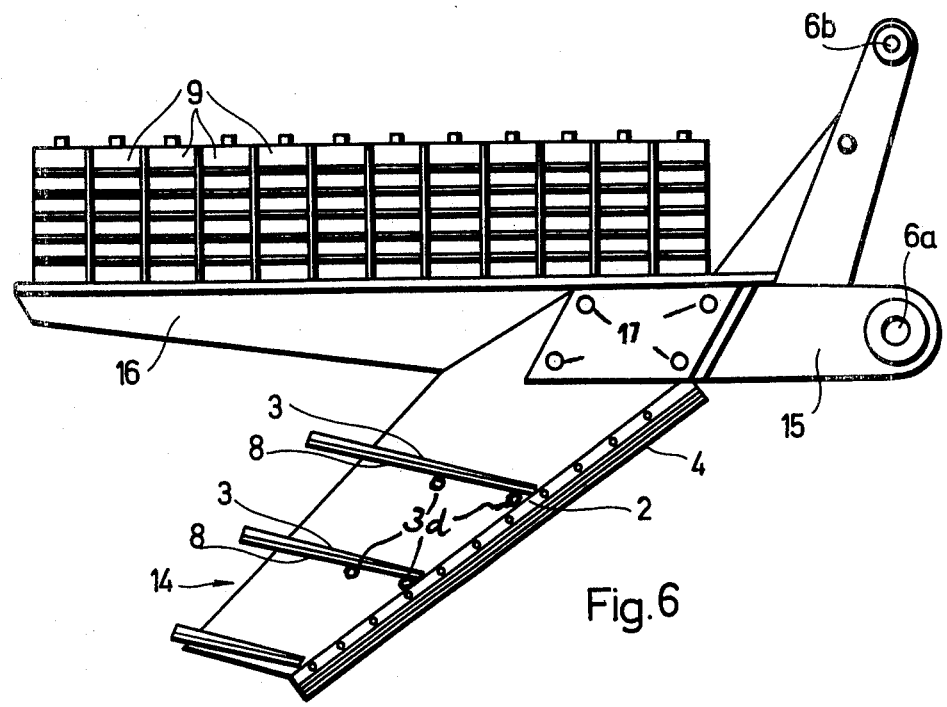
Figure 7:
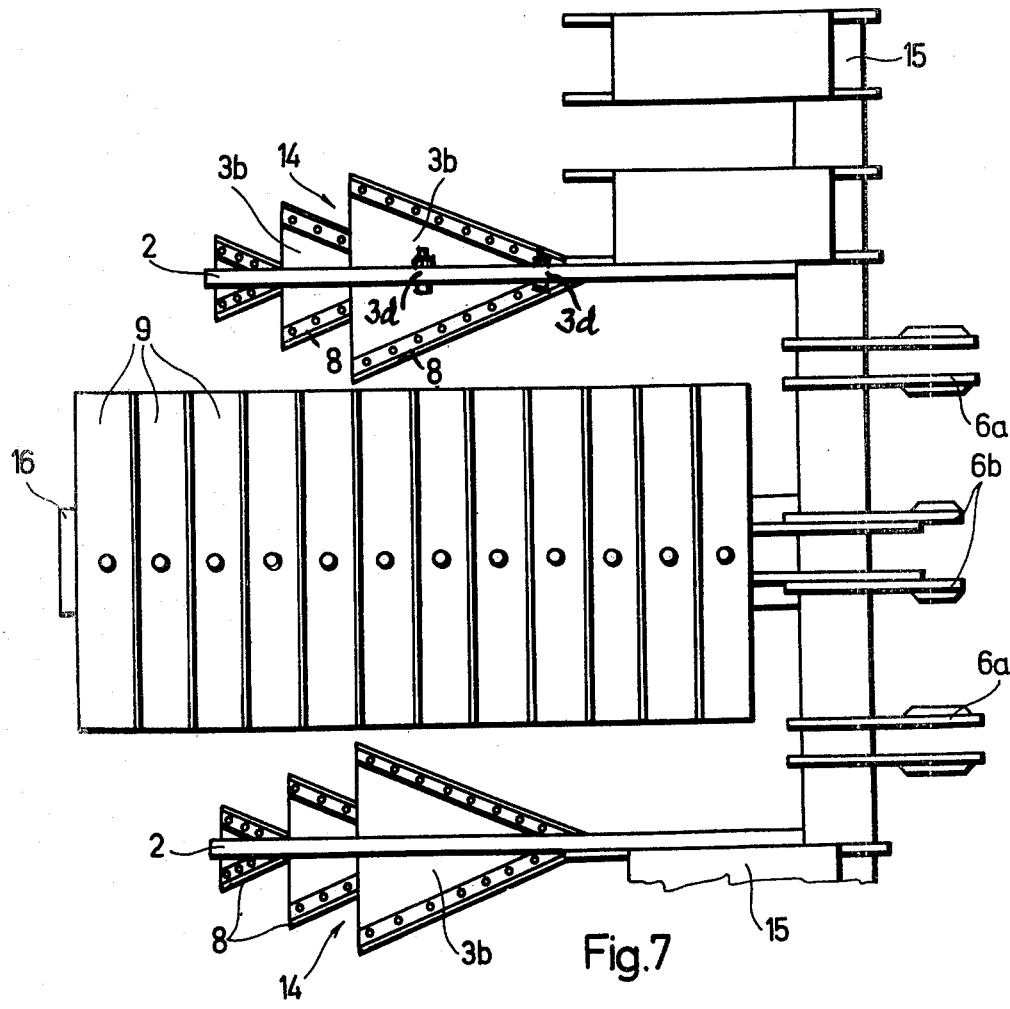

FIG. 6 is a side view of a modified tiller mechanism, suitable for use when more than one is needed, e.g. for tilling wide areas, in a set-up as shown in FIG. 7; and FIG. 7 illustrates the use of two tiller mechanisms (parts of a common central portion of the suspension frame being broken away), with weights being attached between the mechanisms; the attaching and suspension mechanism having been omitted from FIGS. 6 and 7.

The inventive reforestation tillage mechanism can be connected to a power source, e.g. a tractor (not shown) by means of suspension pins 5 and lugs 6, as will be explained later in more detail. Traction force is transferred by a suspension frame 1 between the pins 5, and preferably strutted thereabove with rib plates 7. Inserts 1a shown in FIG. 1 will be described later in connection with FIG. 6. Tillage is by removable (exchangeable) blades 3 adjustably mounted on a holder shank 2. The blades 3 are positioned at one, two or more levels, and define an angle of about 10 to 40 degrees with respect to the traveling or hauling direction (toward the righthand side in FIGS. 4 to 7) or the substantially horizontal soil surface.

The blades 3 start behind a cutter blade 4 mounted to the blade holder shank 2, and may have a trapezoidal, rectangular, triangular, segmental or semicircular form, as shown in FIGS. 1, 1A, 2 and 3. Alternative blade configurations 3a, 3b and 3c can be seen in FIGS. 1A, 2 and 3, respectively. The size of the blades located, preferably, at three different levels may diminish downwards since lateral roots of plants are generally shorter in this direction so that, deeper into the soil layers, a narrower loosened-up band is sufficient for the root system. This also reduces the required traction force.

The blades 3 can be asymmetrically mounted (not shown) with respect to the shank 2. Furthermore, the plane of the latter 2 and that of the blades 3 need not be normal to each other. The angle included by the blades 3 with the direction of haulage is not necessarily identical. Blades located at a lower level may be set at a wider angle (not shown). The blades 3 can be equipped with exchangeable edges 8, 8c, in the direction of advancement, as shown in FIGS. 1 through 3, including 1A and 1B. Conventional, preferably removable, attaching devices can be used as shown in FIG. 1B.

Figure 4:
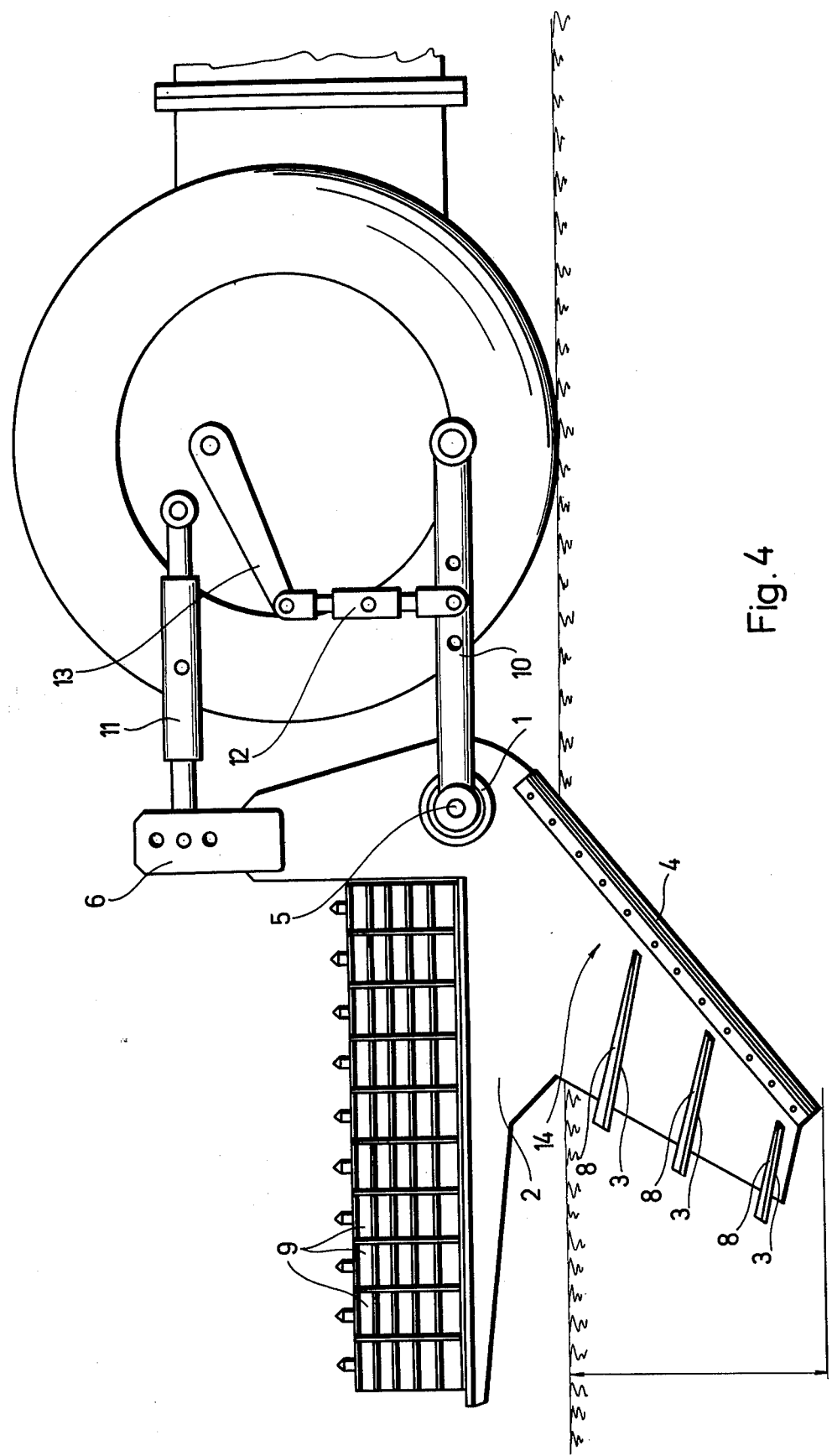
FIG. 4 is a side view of a tiller mechanism with its attaching means, constituting a three-point suspension or hitch with respect to schematically shown stationary portions of the tiller itself.
Figure 5:
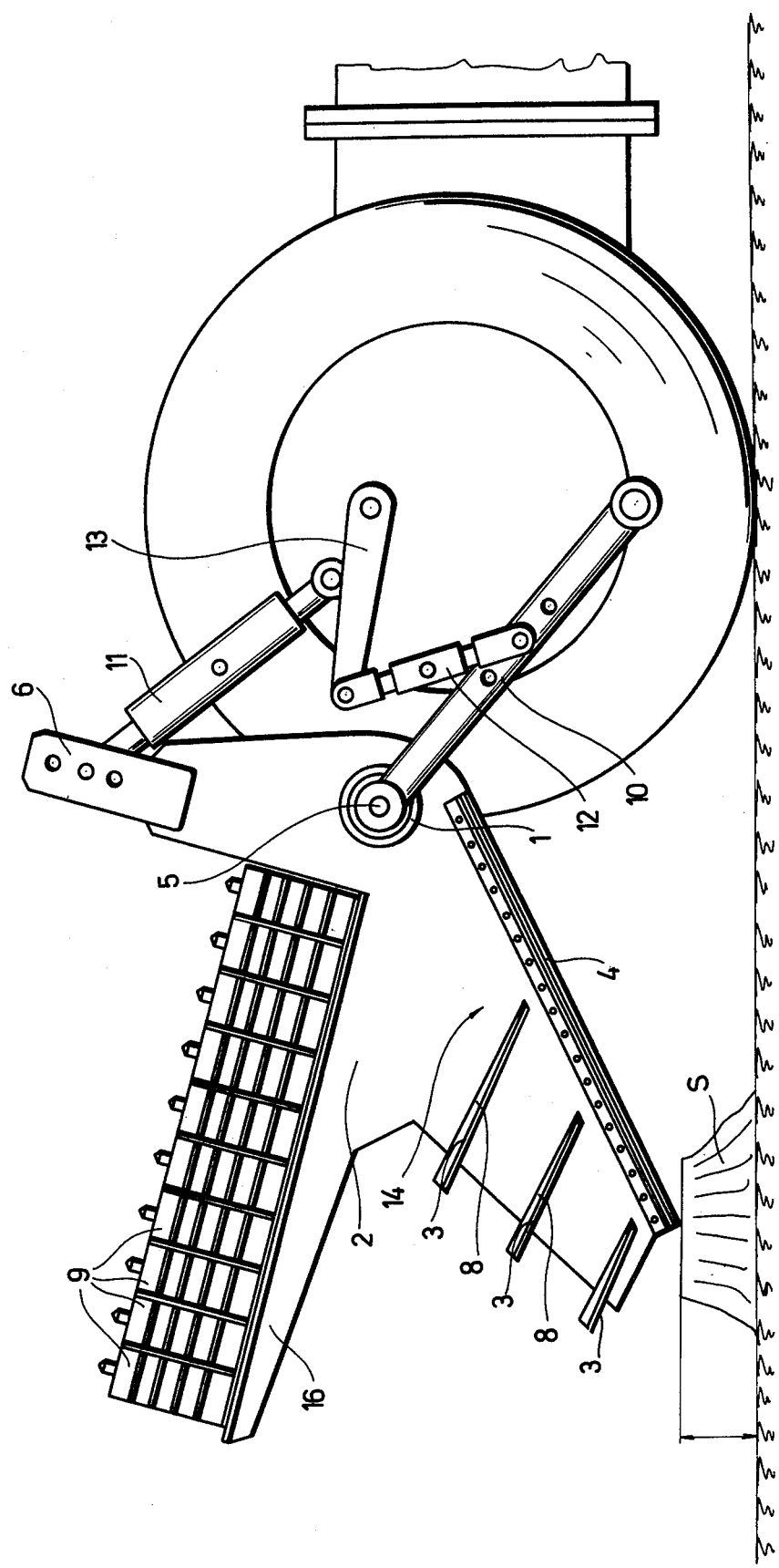
FIG. 5 is a view similar to that of FIG. 4 but illustrating the effect of a stump in the soil that has raised and pivoted the mechanism, thereby avoiding breakage and operational troubles.

It should be noted that the cutter blade 4 itself may have removable edge or blade portions (shown in FIGS. 4 to 6 but not numbered). The cutter blade 4, preferably of a removable construction, is mounted on the shank 2 in such a manner to make that part which is lowered into the soil during the tilling operation define an angle of about 120° to 155° with respect to the traveling or hauling direction but opposite thereto.

The exact values of the size, form, number and construction of the blades 3 can be determined with respect to local conditions (soil properties, power machine, etc.) when taken into consideration. The local conditions may allow a single pair of the blades to be used effectively, in a soil that presents but little resistance; for tougher soils, two or preferably three pairs of blades are recommended. Thus bent, perforated or such blades may also be employed that are composed of several interconnected planes. In order to further increase tilling efficiency, and to reduce traction force requirements, the mechanism can be vibrated by conventional means (not shown), in addition to the above alternatives.

Not to clutter the so far described illustrations, conventional elements for removably and adjustably securing the blades 3 . . . to the shank 2 are shown only in FIGS. 6 and 7, namely at 3d, which do not require further clarification.

Where the dead weight of the mechanism and/or the angle of blade setting are insufficient for a deep enough depression, it can be supplemented with the application of removable and adjustable weights such as shown at 9 in FIGS. 4 to 7.

The inventive tiller can be constructed in both suspended and hauled versions. While FIGS. 1, 4 and 5 relate to a single tiller mechanism, it will be described later with respect of FIGS. 6, 7 that a number of parallel mechanisms can also be operated, attached to or suspended from a common frame.

It will be understood by those skilled in the art that the straight cutter blade 4 is adjustably mounted to the blade holder shank 2, as is customary in similar devices. It might be added at this point that the earlier-mentioned optional vibration may be applied to either the holder shank, to the individual tiller blades, or to weights, if used in the mechanism, as explained earlier.

FIGS. 4 and 5 show an attaching and a three-point suspension mechanism for the one or plural tiller mechanisms. Inner or right-hand ends of linkage members 10, 11 and 13 are pivotally attached to stationary portions of the tractor, tiller housing, and the like, as shown. Member 13 forms an articulation with a further member, 12, which leads to an adjustable point about midway of the member 10. The members 11, 12 are shown with conventional arrangements for optional length adjustment.

The outer or left-hand ends of the members 10, 11 are respectively pivoted to the pins 5 of the frame 1, and to one of several apertures provided in in the lugs 6. It is simple to visualize how the structure of FIG. 1 is fitted into FIGS. 4 and 5.

It can be seen by comparing FIGS. 4 and 5 how the inventive arrangement operates during normal tilling, and if a stump and the like is encountered. In the former illustration, the weight of the mechanism (possibly aided by the additional weights 9) forces the blades 3 and 4 into the soil. The direction of hauling is toward the right-hand side, and it can be seen how the respective, earlier explained downwardly and upwardly inclined angles allow any serious obstacle, like the large stump S shown in FIGS. 5, to lift and pivot the tiller mechanism, during the advancement and as a result thereof, avoiding any breakage or possible distrubance, as is so common with prior-art tillers.

Once the obstacle is cleared, the weight of the mechanism makes it to drop back into the soil, to continue tilling, while the attaching and suspension system 10 . . . 13 performs its movements between the extreme pivotal and angular positions as illustrated in FIGS. 4 and 5. The explained length adjustments and the point of attack of the member 12 at a selected point of member 10, together with the adjustability between member 11 and one of the apertures in lugs 6, allow a wide range of corrections, adjustments and coordination to various local and terrain conditions.

We are now coming to the multiple arrangement exemplified in FIGS. 6 and 7. While FIGS. 1, 1A, 2 and 3 showed the variously shaped tiller blades 3, 3a, 3b and 3c, the modified, multiple arrangement only illustrates those identified as 3 and 3b, although of course all forms and shapes are interchangeable. From the exchangeable edges 8 and 8c exemplified in FIGS. 1 and 3, only the former is shown here since all edges are straight. Including the FIGS. 1, 4 and 5, the tiller mechanisms are identified by the general numeral 14, on the already described shanks 2, and carried by a suspension frame 15 which has separate portions for each tiller mechanism 14, and a common, central portion interconnecting them, as can be seen in FIG. 7.

A separate holder 16 may be used for the weights 9, and intermediate supports or attaching elements 17 may also be provided between the frame 15 and the respective shank 2. In a manner that will become clear when referring to FIG. 1, the pivotal connection to the attaching and suspension means is accomplished here by respective arms having openings 6a, 6b therein, for respective engagement by the linkage members 10, 11 (instead of the parts 5, 6 of the first, single embodiment).

In a manner that will be understood by those skilled in the art, the protruding pins 5 (FIG. 1) can be used interchangeably in such structures with the openings 6a (FIG. 6), and a further refinement can be applied in either embodiment in that reversible, adjustable inserts 1a can be used as shown in FIG. 1. The multiple arrangement can also be provided with the strutting rib plates 7 as was described for the first embodiment and shown in FIG. 1 at 7.

The opening 6b in the short arm or arms of the frame 15 is to be considered schematic and exemplary since it is entirely possible to use the multiple openings as was shown and described for the lugs 6 of the first embodiment, particularly if added adjustment is required with relation to the three-point suspension that attaches to openings 6a, 6b in a manner similar to that described earlier for FIGS. 4, 5.

In either of the single or multiple tiller mechanisms the depth of penetration into the soil can be regulated by the judicious application or move or less weights, even differently between consecutive weight holders 16. However the invention also contemplates the use of individual groups of weights for each mechanism 14 of FIGS. 6, 7, as was shown in FIGS. 4, 5.

It should be emphasized that the attachment between the parts 5 or 6a and 10, and between the elements 6 or 6b and 11 is not rigid but completely loose so that the tiller mechanism(s) can "float" behind the tractor and the like and adapt itself to the terrain, not only in respect of stumps, roots and the like major obstacles, but also in regard to the consistency (dryness, composition, etc.) of the soil being tilled.

It is possible to include hydraulic piston elements in at least one or more of the members 10 . . . 13 thereby to increase the facility of the blades 3 and 4 leaving or entering the terrain. Such hydraulic elements (not shown) would lend the three-point suspension further adaptability in performing the required pivotal and angular movements.

The inventive reforestation tillage mechanism, particularly in its single-mechanism embodiment, is suitable to provide an answer to the hitherto unsolved problem of deep tillage, e.g. for reforestation purposes, over an area which does not require stump or root removal in advance. The replaceable edges of the cutter blade 4 and the blades 3 cut stumps of a smaller diameter and smaller roots, while stumps of a wide diameter and, therefore, extreme resistance, or thick roots, will tilt the mechanism about the suspension pins, as explained before, so that it is lifted out of the soil, and can continue to operate without any trouble.

An experimental mechanism made on the basis of the present invention was used for continuous soil preparation work to a depth of 30 to 90 centimeters, and a width of 80 to 100 cm, in an area full of roots and stumps, representing the conditions of almost any afforestation, reforestation, and affiliated jobs.

The greatest advantage of the tiller mechanism of the novel reforestation tillage mechanism according to the present invention is its solving the problem with a rather simple construction, build yet with a very high efficiency. It makes extremely expensive and awkward stump and root removal operations entirely superflous while making possible, at the same time, successful seeding, planting, and cultivation.

The use of the inventive mechanism is not restricted to soil preparation for the reforestation of rooty areas, as it can be employed advatageously for other forestry operations as well (e.g. sprouting in coppice), for orchard or vineyard plantation, and in many other agricultural fields.

The above duties cannot be accomplished with any of the known implement types since they would suffer a breakdown or get stranded in an area that has many roots and stumps.

In the multiple-mechanism embodiment, the inventive tillage mechanism is preferred for agricultural work where obstacles (such as roots, stumps, etc.) are less seldom or entirely absent. For a ready adaptation to terrains of varying widths, the invention also provides elements for adjusting (not shown) the distances between the mechanisms 14 on the frame 15, e.g. at the attaching elements 17, in a slidable and possibly removable manner. It is also contemplated to use one or two pairs of the tandem-attached mechanisms, with or without the weights therebetween. Even without stumps the advantages of the invention are quite evident because unusually hard or dry soil can tilt the mechanism upward, just like a stump, thereby presenting the novel advantages of this invention under all conditions of use.

It will be understood that various modifications, additions and changes are possible in the exemplary, preferred embodiments without departing from the spirit and scope of the invention.

What we claim is:

1. A reforestation tillage mechanism, attachable to a three-point hitch of a hauling tractor, the mechanism comprising: at least one transverse suspension frame; at least two tiller mechanisms on said frame in a substantially parallel arrangement; three-point hitch connections on said frame for floatingly carrying said tiller mechanisms on the tractor during a tillage operation and for raising the frame for transport; each tiller mechanism comprising blade holder shank having an upper end secured to said frame and being pivotable therewith about said connections in a vertical plane, the main dimension of said shank being substantially normal to the axis about which said frame can pivot; at least one, substantially straight cutter blade removably mounted to a lower forward edge portion of said shank, defining an angle of about 120° to 155°, downwardly inclined with respect to the direction of haulage but opposite thereto; at least one pair of substantially parallel, transversely extending tiller blades removably mounted on opposite sides of said shank behind said cutter blade with respect to the direction of haulage, sloping with respect thereto, and defining an angle of about 10° to 40°, upwardly inclined toward rear free ends of said tiller blades, with respect to the direction of haulage; said holder shank, said cutter blades and said tiller blades forming part of said tiller mechanisms; the aforesaid angles contributing to said tiller mechanisms being floatingly carried while said cutter blades and said tiller blades are partly lowered into the soil, so that said cutter blades and said tiller blades normally till the soil but some large stump can divert said tiller mechanisms upwardly about said hitch, said cutter blades and said tiller blades being then at least partly lifted out of the soil; and weight holder means attached to said frame intermediate said tiller mechanisms to secure removably weight means whereby to increase the weight of the tiller mechanisms and to assist the latter to drop into the soil after the stump has diverted said tiller mechanisms; said cutter blades and said tiller blades being then allowed to drop by the effect of said weight means, whereby to continue the tilling without any breakage.

2. The reforestation tillage as defined in claim 1, wherein said tiller blades have at least one special form, such as one of trapezoidal, rectangular, triangular, segmental and semicircular forms.

3. The reforestation tillage as defined in claim 1, wherein at least one of said cutter blades and said tiller blades has removable edge portions thereon.

4. The reforestation tillage as defined in claim 1, further comprising at least one rib plate for strutting said at least one blade holder shank with respect to said at least one suspension frame.

5. The reforestation tillage mechanism as defined in claim 1, wherein said three-point hitch includes attaching means for said tiller mechanisms, with pivotal first and second linkages to said hitch connections and to an upwardly extending portion on said frame, respectively, at least one of said linkages being adjustable.

6. The reforestation tillage as defined in claim 25, wherein said pivotal linkages connect to angularly spaced-apart portions of a common central portion of said suspension frame.

7. The reforestation tillage as defined in claim 6, further comprising an intermediate support between said at least one suspension frame and the respective at least one blade holder shank thereon.

8. The reforestation tillage as defined in claim 5, wherein said first pivotal linkage includes adjustable inserts in said suspension frame for said hitch connections.

9. The reforestation tillage as defined in claim 1, wherein said three-point hitch includes a linkage with first, second, third and fourth members; said first, said second and said fourth members being pivotally connected to tractor portions; said fourth member forming an articulation with one end of said third member while the other end of the latter is linked to an adjustable intermediate point of said first member; and wherein said first and said second members are respectively linked to said hitch connection and to said upper end of the blade holder shank.

10. The reforestation tillage as defined in claim 9, wherein at least one of said linkage members has means for length adjustment thereof.

* * * * *